US010003492B2

(12) United States Patent
Brown et al.

(10) Patent No.: US 10,003,492 B2
(45) Date of Patent: Jun. 19, 2018

(54) SYSTEMS AND METHODS FOR MANAGING DATA RELATED TO NETWORK ELEMENTS FROM MULTIPLE SOURCES

(71) Applicant: CENX, Inc., Ottawa (CA)

(72) Inventors: Andrew Brown, Ottawa (CA); Philippe Rene, Drummondville (CA); Eric Soutar, Ottawa (CA); Peyo Tzolov, Ottawa (CA); Achint Sandhu, Ottawa (CA)

(73) Assignee: CENX, INC., Ottawa (CA)

( * ) Notice: Subject to any disclaimer, the term of this patent is extended or adjusted under 35 U.S.C. 154(b) by 472 days.

(21) Appl. No.: 14/630,394

(22) Filed: Feb. 24, 2015

(65) Prior Publication Data

US 2016/0246783 A1    Aug. 25, 2016

(51) Int. Cl.
*H04L 12/24*    (2006.01)

(52) U.S. Cl.
CPC ...... *H04L 41/0233* (2013.01); *H04L 41/0866* (2013.01)

(58) Field of Classification Search
CPC ............. H04L 41/0233; H04L 41/0866; G06F 17/30563
See application file for complete search history.

(56) References Cited

U.S. PATENT DOCUMENTS

| | | | | |
|---|---|---|---|---|
| 6,272,341 | B1* | 8/2001 | Threadgill | H04B 7/18506 455/428 |
| 6,363,411 | B1* | 3/2002 | Dugan | H04M 3/42136 379/201.01 |
| 2003/0233635 | A1* | 12/2003 | Corrie | G06F 11/3672 717/124 |
| 2005/0091537 | A1* | 4/2005 | Nisbet | G06F 21/55 726/4 |
| 2005/0114505 | A1* | 5/2005 | DeStefano | G06F 17/2705 709/224 |
| 2005/0182767 | A1* | 8/2005 | Shoemaker | G06F 17/30575 |
| 2009/0198549 | A1* | 8/2009 | Kearns | G06Q 10/06 705/7.12 |
| 2010/0023997 | A1* | 1/2010 | Hu | G06F 21/6218 726/1 |

(Continued)

*Primary Examiner* — Jorge A Casanova
(74) *Attorney, Agent, or Firm* — Sterne, Kessler, Goldstein & Fox P.L.L.C.

(57) ABSTRACT

Systems and methods are disclosed for managing data related to network elements in a telecommunications network. In an embodiment, a document containing data related to one or more of the network elements is received. The document is associated with a corresponding source provider, a location, a receipt timestamp indicating the time and date that the data was received, and a creation timestamp indicating the time and date that the data was created. A document class is then detected for the received document, and an intermediate representation of the document is generated that includes a plurality of key-value pairs. The intermediate representation is parsed to identify relevant values that correlate to a network model that includes a plurality of network entities representing types of network elements in the telecommunications network. Finally, the identified values are normalized according to the network model and written to a networking database.

31 Claims, 8 Drawing Sheets

(56) References Cited

U.S. PATENT DOCUMENTS

| | | | | |
|---|---|---|---|---|
| 2010/0214952 A1* | 8/2010 | Gallagher | | H04L 45/02 370/254 |
| 2010/0251340 A1* | 9/2010 | Martin | | G06F 9/541 726/4 |
| 2011/0066601 A1* | 3/2011 | Rieger | | G06Q 20/10 707/690 |
| 2011/0252002 A1* | 10/2011 | Ben-Dyke | | G06F 17/30297 707/661 |
| 2012/0005542 A1* | 1/2012 | Petersen | | G06F 11/0709 714/48 |
| 2012/0197898 A1* | 8/2012 | Pandey | | H04L 67/12 707/741 |
| 2013/0246334 A1* | 9/2013 | Ahuja | | G06F 17/30713 707/600 |
| 2014/0101091 A1* | 4/2014 | Brown | | G06F 17/30342 707/602 |
| 2015/0149609 A1* | 5/2015 | Zou | | H04L 67/2833 709/224 |

\* cited by examiner

SYSTEMS AND METHODS FOR MANAGING DATA RELATED TO NETWORK ELEMENTS FROM MULTIPLE SOURCES

BACKGROUND

Field

This field is generally related to managing data related to network elements in a telecommunications network.

Background

Modern communications carriers operate local, regional, and nationwide networks to provide connectivity to customers. These networks are built with a variety of equipment to perform various tasks, and such equipment may be manufactured by multiple vendors. Each piece of equipment may be complex enough to handle hundreds or thousands of simultaneous connections, and different pieces of equipment may be widely dispersed across a region. Wireless base stations, for example, are geographically distributed across a city to optimize coverage and efficiency. Customer expectations of network availability, given such distribution, complexity, and heterogeneity of equipment, mandates fast detection and accurate diagnosis of network issues that may arise.

In order to ensure network reliability, the data used to define a complex communications network must be consistent among network planners, service providers, and vendors. Data used by these parties may be largely unstructured or dissimilarly formatted. Exchange of data between parties may require manual entry of data from one system or document to another. This manual process is error prone, and fast detection of inconsistencies between data sets, as well as the source of inconsistencies, can aid in ensuring reliability of the network.

When network issues arise, a network operator may be required to search through various network-related data in hopes of identifying the source of the issue. Due to the complexity of current communications networks, manual detection of inconsistencies among varyingly structured or unstructured data from multiple parties is not viable to ensure desired network availability. Therefore, a solution is needed that allows for varyingly structured or unstructured network-related data to be automatically processed in a consistent and efficient manner.

BRIEF SUMMARY

Systems and methods are disclosed for managing data related to network elements in a telecommunications network. In an embodiment, a document containing data related to one or more of the network elements is received. The document is associated with a corresponding source provider, a location, a receipt timestamp indicating the time and date that the data was received, and a creation timestamp indicating the time and date that the data was created. A document class is then detected for the received document, and an intermediate representation of the document is generated. The intermediate representation includes a plurality of key-value pairs, and each key-value pair is associated with a network element in the network.

A parsing template is then identified based on the document class and the document's corresponding source provider. The parsing template includes a plurality of parsing rules that define how to identify relevant values in the intermediate representation. The document is parsed according to the parsing rules, and the identified relevant values are then correlated to a network model that includes a plurality of network entities representing types of network elements in the telecommunications network. Each network entity includes one or more attributes, and each identified value is correlated to an attribute of a network entity in the network model. Finally, the identified values are normalized according to a format defined by the network model and written to a networking database.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Network Model

A complex telecommunications network may include thousands of network elements distributed across multiple regions and locations. Interconnected sites, equipment, and features may be controlled and maintained by different parties, and a single network element may be designed, implemented, and managed by different parties. Each party may maintain its own set of data related to network elements in the network. These data sets may be varyingly structured or largely unstructured, making it difficult to efficiently compare and analyze data from different sources. Embodiments of the present invention address this issue by normalizing disparate sets of network-related data using a network model, such that the normalized data can be handled by a single set of processes. The network model sets out a consistent structure to be applied to varying data from multiple sources, enabling automated processing of the data as a whole. This allows for efficient detection of data inconsistencies that helps to ensure network reliability.

Figure 1:
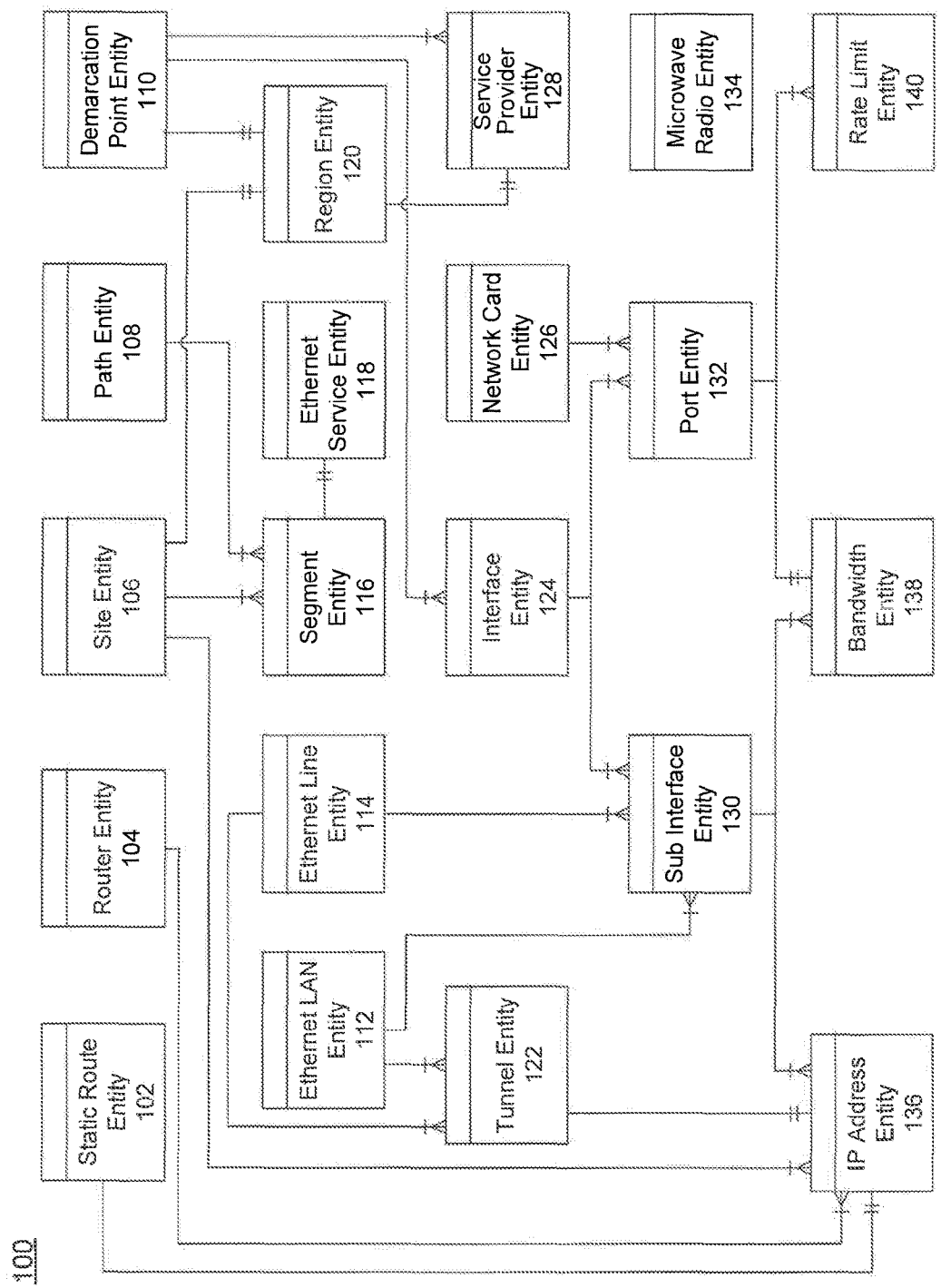
FIG. 1 is a diagram illustrating a network model that includes a plurality of entities, each entity representing a type of network element in a telecommunications network, according to an embodiment.

FIG. 1 is a diagram illustrating a network model that includes a plurality of network entities, each entity representing a type of network element in a telecommunications network, according to an embodiment. A network element may refer to a specific facility, piece of equipment, or logical grouping of equipment used in the network. A network element may also refer to features, functions, and capabilities that are provided by such facility or equipment. Each network entity may include several attributes, which are not explicitly shown in FIG. 1.

Network model 100 includes static route entity 102, router entity 104, site entity 106, path entity 108, demarcation point entity 110, Ethernet LAN entity 112. Ethernet line entity 114, segment entity 116, Ethernet service entity 118, region entity 120, tunnel entity 122, interface entity 124, network card entity 126, service provider entity 128, sub interface entity 130, port entity 132, microwave radio entity 134, Internet Protocol (IP) address entity 136, bandwidth entity 138, and rate limit entity 140. The entities in the network model define the types of network elements in the network, and the network model defines the relationships between those types. In the embodiment of FIG. 1, line endings indicate the cardinality of a relationship. For example, the relationship between interface entity 124 and port entity 132 indicates that a network interface may include one or more ports, while the relationship between site entity 106 and region entity 120 indicates that a site is part of exactly one region. FIG. 1 depicts one particular embodiment of a network model, and entities and relationships may be added, removed, or modified in other embodiments.

Each set of data may relate to a portion of network elements in the network, and each network element can be classified according to an entity in the network model. Network element attributes and relationships to other network elements may be populated as data from multiple sources and sets is normalized, helping to depict the topological structure of the network as a whole. The aggregated, normalized data may then be analyzed to ensure data values are consistent across multiple sources and data sets.

In an embodiment, network model 100 is extensible in that entities may be added and removed from the model. As network technology evolves, it may be necessary to accommodate new types of network elements in the model. To incorporate a new entity into the network model, attributes and relationships to existing entities simply need to be defined. Similarly, entities may be removed from the model by deleting its relationships with other entities. Attributes and relationships of existing entities may also be updated and redefined as necessary. This allows for the network model to adapt to the changing structure of a telecommunications network.

Method

Figure 2:
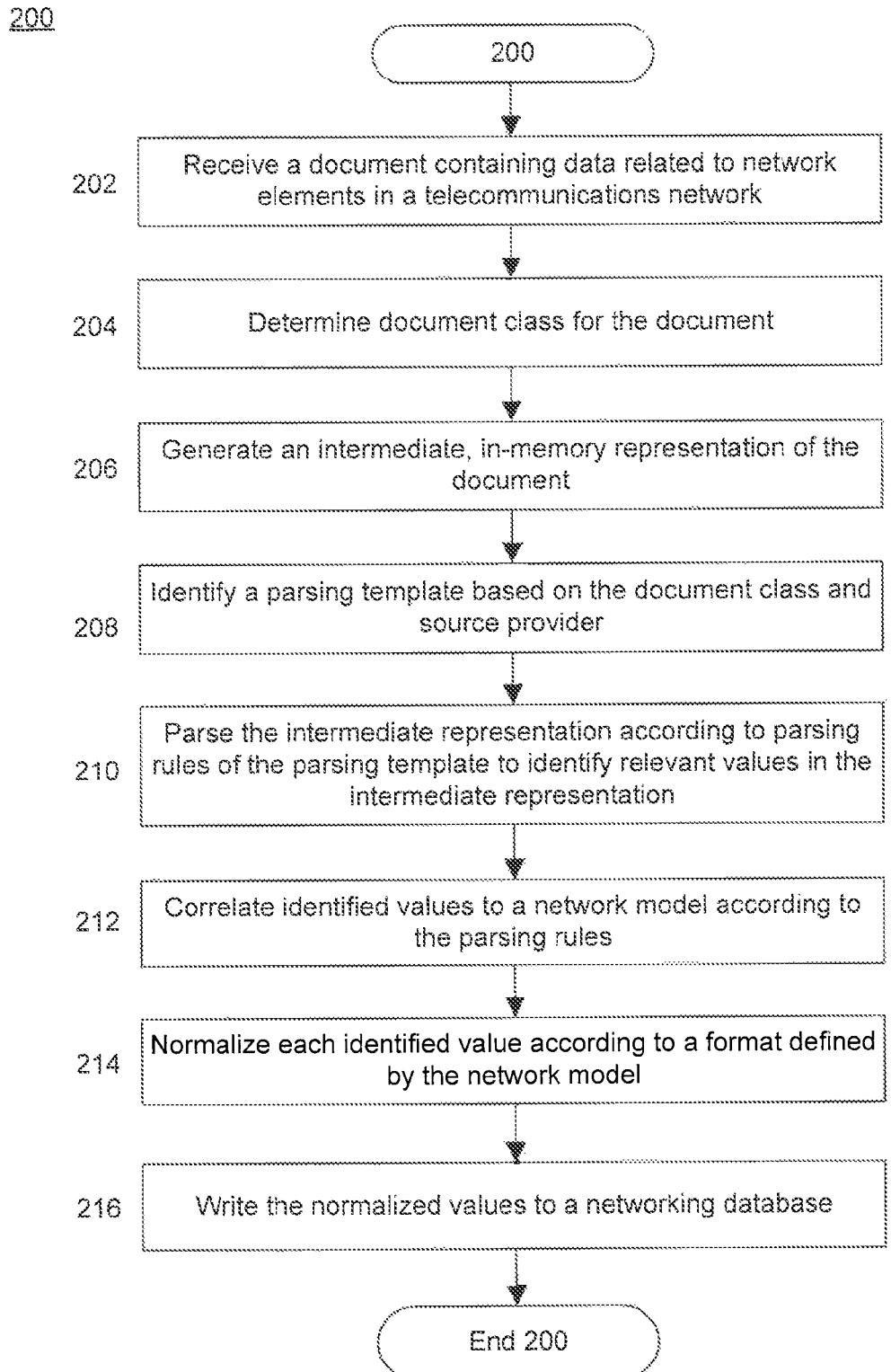
FIG. 2 is a flowchart illustrating an example method for receiving and managing data related to network elements in a telecommunications network from a plurality of source providers, according to an embodiment.

FIG. 2 is a flowchart illustrating an example method for receiving and managing data related to network elements in a telecommunications network, according to an embodiment. Method 200 begins at step 202 when a document containing data related to one or more network elements in a telecommunications network, such as a mobile backhaul network, is received from a source provider. In an embodiment, a document may refer to an electronic file, such as, but not limited to, a spreadsheet, word processing file, or XML file. In another embodiment, a document may refer to any collection of data, such as a result set from a database query. Examples of source providers may be, but are not limited to, equipment within the network, equipment manufacturers, equipment installers, network operators (e.g., Internet service providers), network planners, vendors providing network analytics, or other network-related vendors. The document may also be associated with a location indicating where the source document resides, a receipt timestamp indicating the time and date that the data was received, and a creation timestamp indicating the time and date that the data was created.

At step 204, a document class may be determined for the document. The document class may be used, at least in part, to determine how to process the received document. Examples of document classes may include, but are not limited to, a router configuration, a performance report, or an inventory listing. The document class may be determined automatically based on document content or metadata, or manually specified.

The received document may be largely unstructured or formatted according to the source provider. At step 206, an intermediate representation of the document data may be generated in order to efficiently process the document. The intermediate representation may include a plurality of key-value pairs extracted from the document, where each key-value pair is associated with a network element in the telecommunications network. For example, a key-value pair may express the location of a network site or the bandwidth of a port of a particular network interface. In an embodiment, the intermediate representation may be in the form of a one-dimensional or multi-dimensional array of key-value pairs. This type of representation may be suitable for documents with a basic structure, such as a spreadsheet or database result set.

In another embodiment, the intermediate representation may be in the form of an abstract syntax tree. The process of generating the abstract syntax tree may be similar to, for example, that used by modern compilers in conducting lexical analysis of source code. For example, the document may be parsed according to a predefined grammar that aids in identifying logical sequences of characters that, when assigned a type or category, form tokens. The tokens may be arranged in a tree structure, and data keys and values may be represented by individual or sequences of tokens. This type of representation may be particularly useful when the received document is largely unstructured and requires a more complex generation strategy. Further details of the process of lexical analysis are well known in the art.

The generation of an intermediate representation enables more efficient parsing and search strategies to be performed. As the document may be largely unstructured, or not optimally structured, search operations may require examining the entire document. This may be repeated when searching for multiple data values in the document. By generating an intermediate representation of the document, search strategies can be optimized. For example, when searching an abstract syntax tree, an optimized search strategy may require only a limited number of branches to be examined. Although the generation of an intermediate representation may add some additional initial cost, this cost is outweighed by the improved efficiency of parsing the intermediate representation.

Returning to method 200, at step 208, a parsing template may be identified based on the document class and the document's source provider. Each parsing template may apply to documents from multiple source providers and/or multiple documents from a single source provider. In an embodiment, the parsing template includes a plurality of parsing rules that define how to identify relevant values in the intermediate representation. Parsing templates may be predefined or defined dynamically as documents are received. In various embodiments, the parsing template and included parsing rules may be stored in a database, a configuration file, or as part of executed software code. One of skill in the art will appreciate that storage of parsing templates and included parsing rules is not limited to these embodiments and may include any logical means of storing data.

At step 210, the intermediate representation may be parsed according to the parsing rules of the parsing template to identify relevant values from the intermediate representation. In an embodiment, each parsing rule may target one or more network entity attributes in a network model representing the telecommunication network. At step 212, the identified values in the intermediate representation may be correlated to an appropriate network entity attribute in the network model. As described previously, the network model is a hierarchical representation of network entities that compose the telecommunications network, and each network entity represents a type of network element in the network.

Each parsing rule may also include search criteria. For example, a parsing rule may be concerned with the subnet mask attribute of an Internet Protocol (IP) Address entity within the network model. In this case, the search criteria may be used during parsing to identify data values within the intermediate representation that correlate to the subnet mask attribute. Parsing templates and parsing rules may be updated in response to additions, deletions, or updates to entities within the network model. At step 214, each identified value may then be normalized according to a format defined by the network model, which is discussed in detail with respect to FIGS. 3-4.

Finally, at step 216, the normalized values may be written to a networking database. The networking database may include a plurality of different types of data related to network elements in the telecommunications network. In an embodiment, the written values are linked to the corresponding correlated network entity attributes and the network elements to which they relate. In an embodiment, each written data value may also be linked to the associated source provider, location, receipt timestamp, and creation timestamp of the document. One of skill in the art will appreciate that the networking database may be any type of structured data store, including a relational or document-oriented database.

In an embodiment, the data within the networking database may be immutable. When updating existing data, new data entries may be written to the database, and each data entry may be linked to the creation timestamp of the data. In this manner, the written data values may be correlated to a determined time period, which may be determined based on the creation timestamp of a data value and the creation timestamp of the next updated data value. This provides built-in audit capabilities, allowing the networking database to be queried as of a particular point in time, such that the data values correlating to a particular time period can be recalled.

In an embodiment, Method 200 may be implemented using a functional programming language. This allows for consistent and predictable processing of data by eliminating program state during execution. In this embodiment, Variables are immutable, and thus the execution of a function, given the same inputs, will always produce the same result, regardless of what has previously occurred. Functional programming also helps to reduce and compartmentalize the code base required to process data related to thousands of network elements from hundreds of sources. Additionally, functional programming enables multiple functions to be executed concurrently in a multi-processor environment, greatly improving the processing speed for large data sets.

Figure 3:
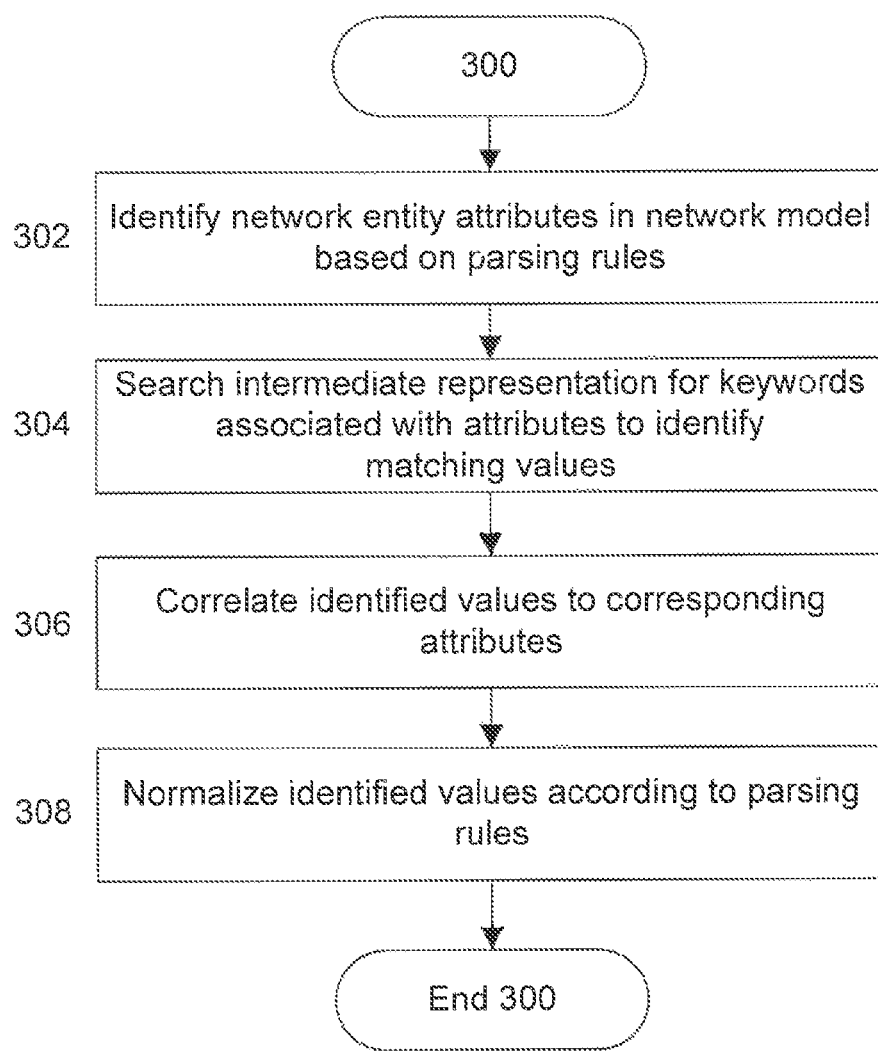
FIG. 3 is a flowchart illustrating an example method for parsing received documents, according to an embodiment.

FIG. 3 is a flowchart illustrating an example method for parsing received documents, according to an embodiment. As described previously, an intermediate representation of a document may be parsed according to parsing rules of a parsing template to identify relevant values that correlate to the network model. Method 300 begins at step 302 by identifying attributes within the network model to target based on the parsing rules. At step 304, the intermediate representation may be searched for keys matching keywords associated with the target attributes to identify matching values. For example, a parsing rule concerned with the subnet mask attribute of an IP Address entity within the network model may specify to search the intermediate representation for the keyword "mask." Data values matching the keyword "mask" may then be identified. Keywords associated with network entity attributes may be predefined and contained or referenced within the plurality of parsing rules. Multiple keywords may also be associated with a single target attribute.

In another embodiment, the intermediate representation may be searched for patterns using regular expressions. For example, concerning the subnet mask attribute, it may be desirable to search the intermediate representation for keys matching both "subnet mask" and "submask" to identify relevant values. In this case, the regular expression "sub*mask" may be used as a search pattern, obviating the need to search for multiple keywords. Search patterns may also be useful when encountering misspellings in the received data. Further details of regular expressions and pattern matching are well known in the art.

At step 306, the identified data values may be correlated to (e.g., linked to) the corresponding network entity attributes. This may be accomplished by, for example, but not limited to, creating a reference between an identified value and a corresponding attribute.

At step 308, the identified values from the intermediate representation may be normalized according to the parsing rules in order to conform to the format of attributes within the network model. In an embodiment, each parsing rule may contain or reference conversion information related to each target attribute. The conversion information may indicate how to convert an identified value to the data format of a target attribute. For example, an identified data value associated with the subnet mask attribute may be in the form of "[xxx.xxx.xxx.xxx]," where "x" indicates a digit 0-9. The conversion information may specify to remove leading and trailing square brackets, and the identified value may be converted to the format "xxx.xxx.xxx.xxx." Normalization of the identified values allows data from multiple sources to be manipulated and acted upon in a consistent manner.

In an embodiment, the conversion information may also include a mathematical conversion factor to be applied to the identified values. For example, the speed attribute of a Port entity within the network model may be formatted in megabits per second (Mbps) and an identified value may be formatted in kilobits per second (kbps). In this case, the conversion information may include a mathematical conversion factor to convert the identified data value from kbps to Mbps, e.g., an identified value of 10,000 kbps may be converted to 10 Mbps.

Figure 4:
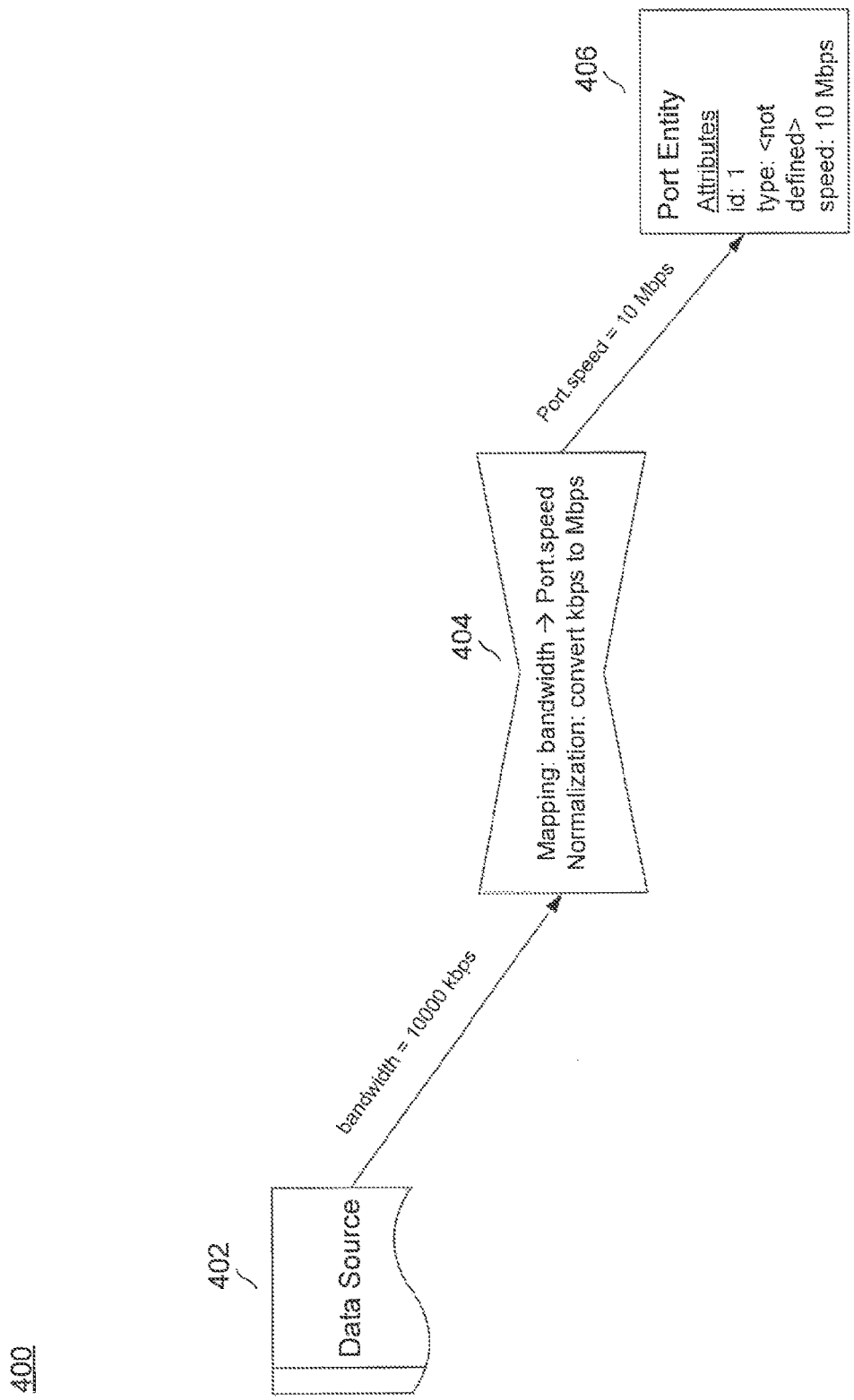
FIG. 4 is a diagram illustrating the correlation of data received from a source provider to a network model representing a telecommunications network, according to an embodiment.

FIG. 4 is a diagram illustrating the correlation of data received from a source provider to a network model representing the telecommunication network, according to an embodiment. The received source document 402 may be parsed, for example as in methods 200 and 300, to identify relevant data values. In the example depicted in FIG. 4, a parsing rule may target the speed attribute of a Port entity within the network model. Block 404 depicts the search criteria used to identify values to associate with the speed attribute. In this example, relevant values may be identified based on the keyword "bandwidth." Block 404 also depicts the normalization information contained or referenced within the parsing rule. As shown, the conversion information specifies to convert identified data values from kbps to Mbps. In the example depicted in FIG. 4, a value of 10,000 kbps is identified. This value is converted to 10 Mbps according to the conversion information, and correlated to the speed attribute of Port entity 406.

Figure 5:
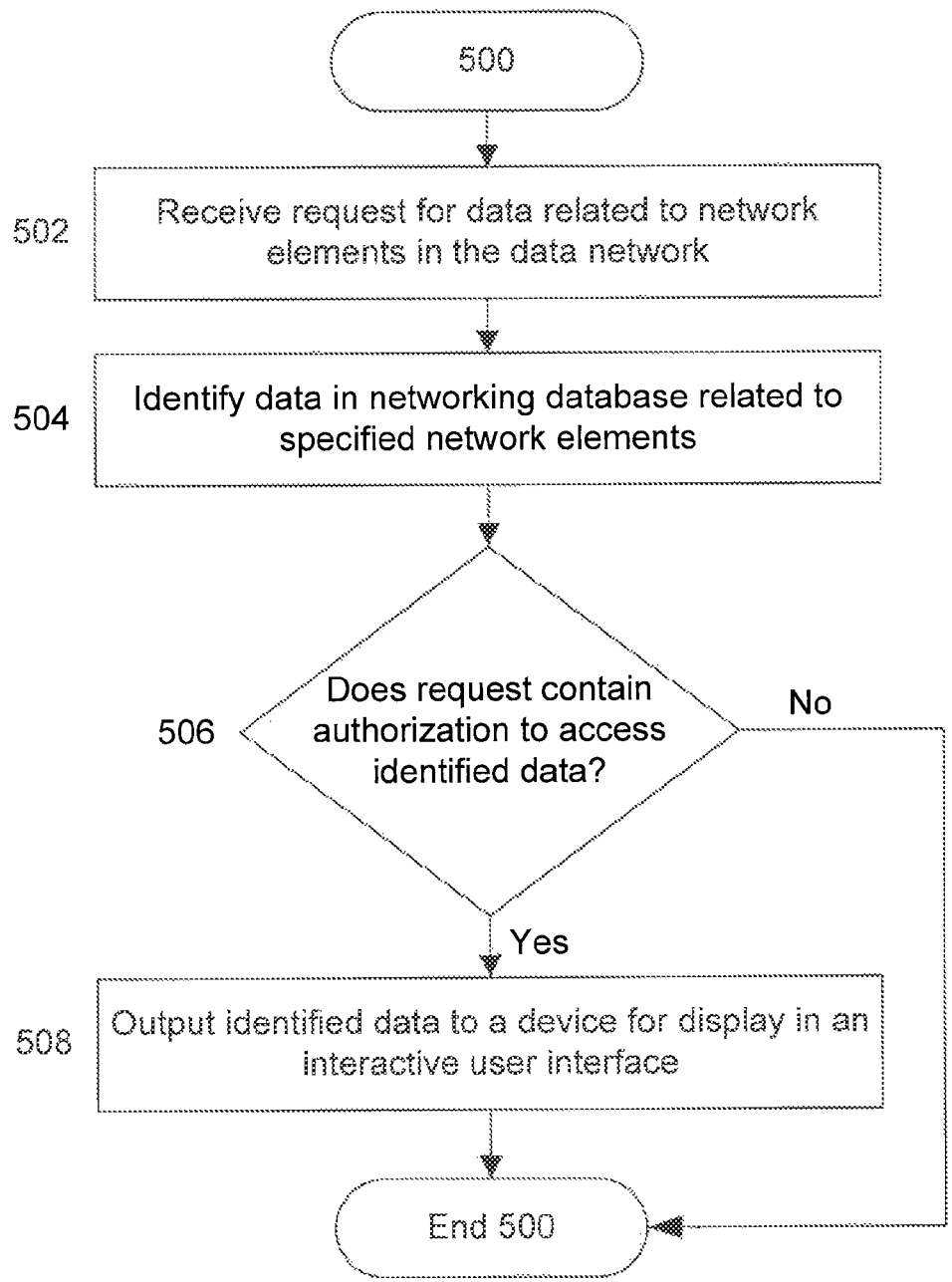
FIG. 5 is a flowchart illustrating an example method for processing a request to access stored data related to network elements in a telecommunications network and presenting the requested data in an interactive user interface, according to an embodiment.

FIG. 5 is a flowchart illustrating an example method for processing a request to access stored data related to network elements in a telecommunications network and presenting the data in an interactive user interface, according to an embodiment. At step 502, a request is received for data related to one or more network elements in the network. At step 504, data in the networking database related to specified network elements is identified. In an embodiment, the request includes a timestamp in the case that historical data is requested.

The data within the networking database may be secured, requiring authorization to access. In an embodiment, a source provider or other party may be authorized to access data within the networking database. This authorization may include access to all data related to the telecommunications network, or only a portion of the data. Authorization may be granted based on specific network elements and attributes, locations of network elements, data sources, or any combination thereof. For example, an Internet service provider may have access to all data related to network elements in regions that they service. This may include data provided by sources other than the Internet service provider. Alternatively, the Internet service provider may be, for example, restricted from accessing data related to network elements managed by other Internet service providers in the same region.

At step 506, it is determined whether the request has proper authorization to access the identified data. At step 508, if authorization to access the data has been granted, the identified data may be retrieved and output to a device for display in an interactive user interface. For example, the data may be displayed through a web interface that allows a user to view and interact with data related to multiple network elements in a single view. Returning to step 506, if authorization to access the identified data has not been granted, the method ends. In an embodiment, an error or message may be returned to the requestor indicating the failure of the request.

In an embodiment, an application programming interface (API) may also govern access to the data in the networking database. In this case, a request may be generated via a call to the API, and the identified data in the networking database may be transmitted to a requestor in response to the request. The data need not be output to a device for display, but may be processed by the requestor after receiving the response. This enables developers and automated systems to, with proper authorization, incorporate network data into third-party applications. This may allow network operators and vendors to view and analyze data related to network elements of interest in the context of the network as a whole.

Figure 6:
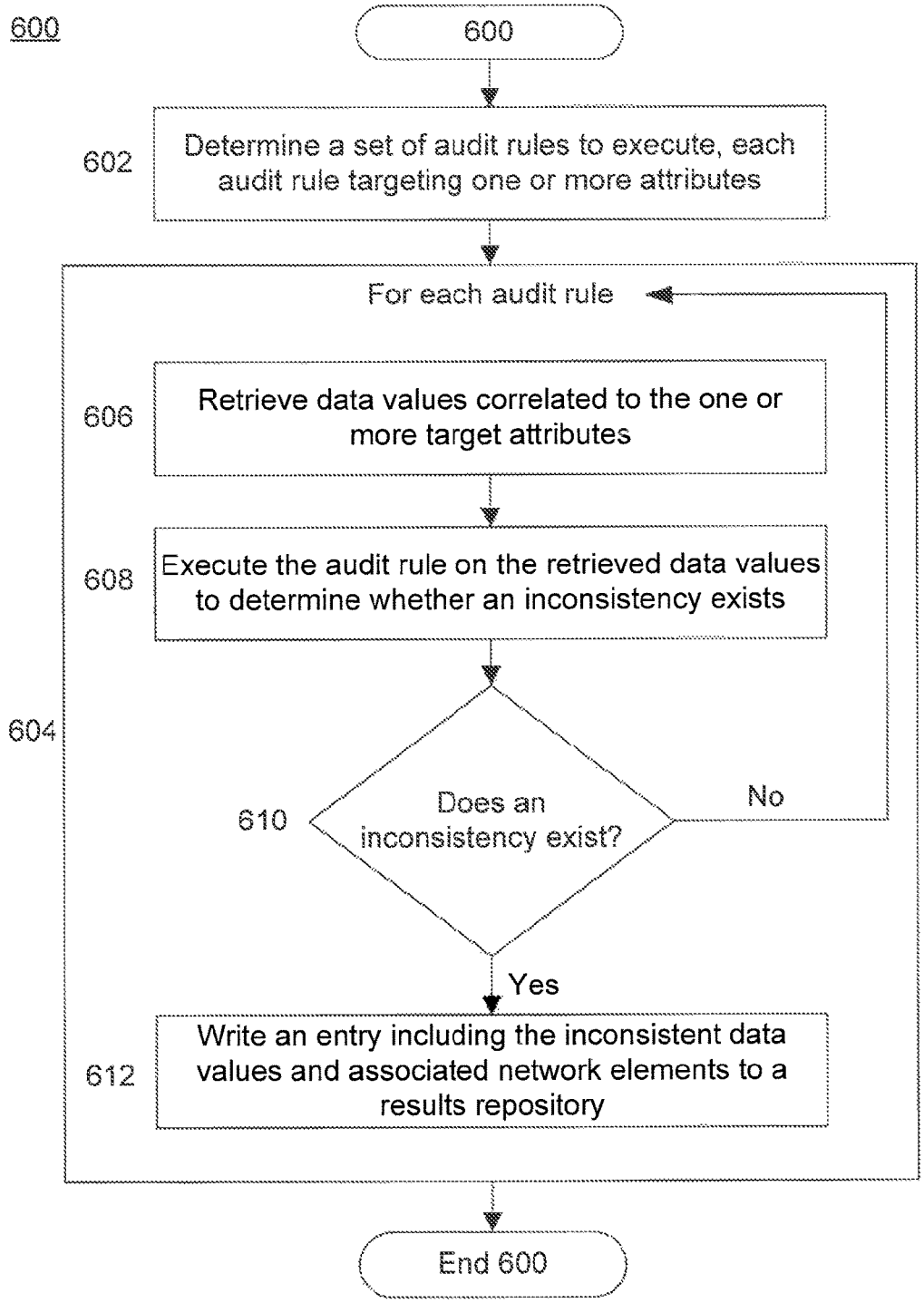
FIG. 6 is a flowchart illustrating an example method for auditing data to detect inconsistencies in a telecommunications network, according to an embodiment.

FIG. 6 a flowchart illustrating an example method for auditing data to detect inconsistencies in a telecommunications network, according to an embodiment. An inconsistency may denote conflicting data values, e.g., a configuration setting that has been miscommunicated from a network planner to an equipment installer, or invalid data values, e.g., a performance reading that is inconsistent with an expected performance measurement. Inconsistencies such as these may lead to decreased reliability in the telecommunications network. Therefore, it is desirable to be able quickly detect and diagnose the source of inconsistencies within the network.

Method 600 begins at step 602 by determining a set of audit rules to execute. Each audit rule may target one or more network entity attributes in the network model. An audit rule be very specific, such as targeting only the speed attribute of all ports within a particular network interface, or it may be broad, such as targeting all attributes of network elements at a particular network site. In an embodiment, an audit rule may be divided into a series of audit checks, where each audit check may perform a specific comparison or validation operation.

At step 604, the set of audit rules is then processed in an iterative fashion. At step 606, for each audit rule, stored data values correlated to the one or more target attributes of the audit rule are retrieved. At step 608, the audit rule is then executed on the retrieved data values to determine whether an inconsistency exists.

In an embodiment, execution of the audit rule may include executing a series of comparison and validation operations on the retrieved data values. Comparison operations may compare data values associated with the same attribute and network element. For example, a value for the speed attribute of a specific port within the network may have been received from a network planner, an equipment installer, and an automated configuration report. By comparing these values, it is possible to quickly identify the source of an inconsistency. Validation operations may check to ensure that values meet set requirements. For example, a specific IP address may be expected to be within a set numerical range, and the validation operation may ensure that any deviation from this range is detected.

At step 610, if an inconsistency is detected from execution of the audit rule, the method proceeds to step 612. At step 612, in an embodiment, one or more entries including the inconsistent data values and associated network elements are written to a results repository. The results repository may be any type of data store, such as a relational or document-oriented database. The method then returns to iterative step 604 to execute the next audit rule. Returning to step 610, if no inconsistency is detected, the method immediately returns to iterative step 604 to execute the next audit rule. Once all audit rules have been executed, the method ends.

In an embodiment, audit rules may be configured to automatically execute at specified time intervals. For example, certain audit rules may be configured to execute once every day, every hour, or every minute. Audit rules may be grouped into sets, and each set may similarly be configured to automatically execute at specified time intervals. In an embodiment, audit rules and sets of audit rules may also be executed manually.

Network inconsistencies written to the results repository may be distributed to appropriate parties by various means. In an embodiment, the entries in the results repository may be retrieved and output to a device for display in an interactive user interface. For example, the entries may be displayed through a web interface that allows a user to view and interact with the inconsistent data. In another embodiment, a report may be generated indicating the inconsistent data values and other relevant information, such as, but not limited to, the sources of the data values and the network elements to which they relate. This report may be distributed automatically to relevant parties in order to remedy the inconsistency. In yet another embodiment, parties may be authorized to access the data in the results repository via an API. This enables parties to integrate the audit results into third party applications for further analysis or display.

System

Figure 7:
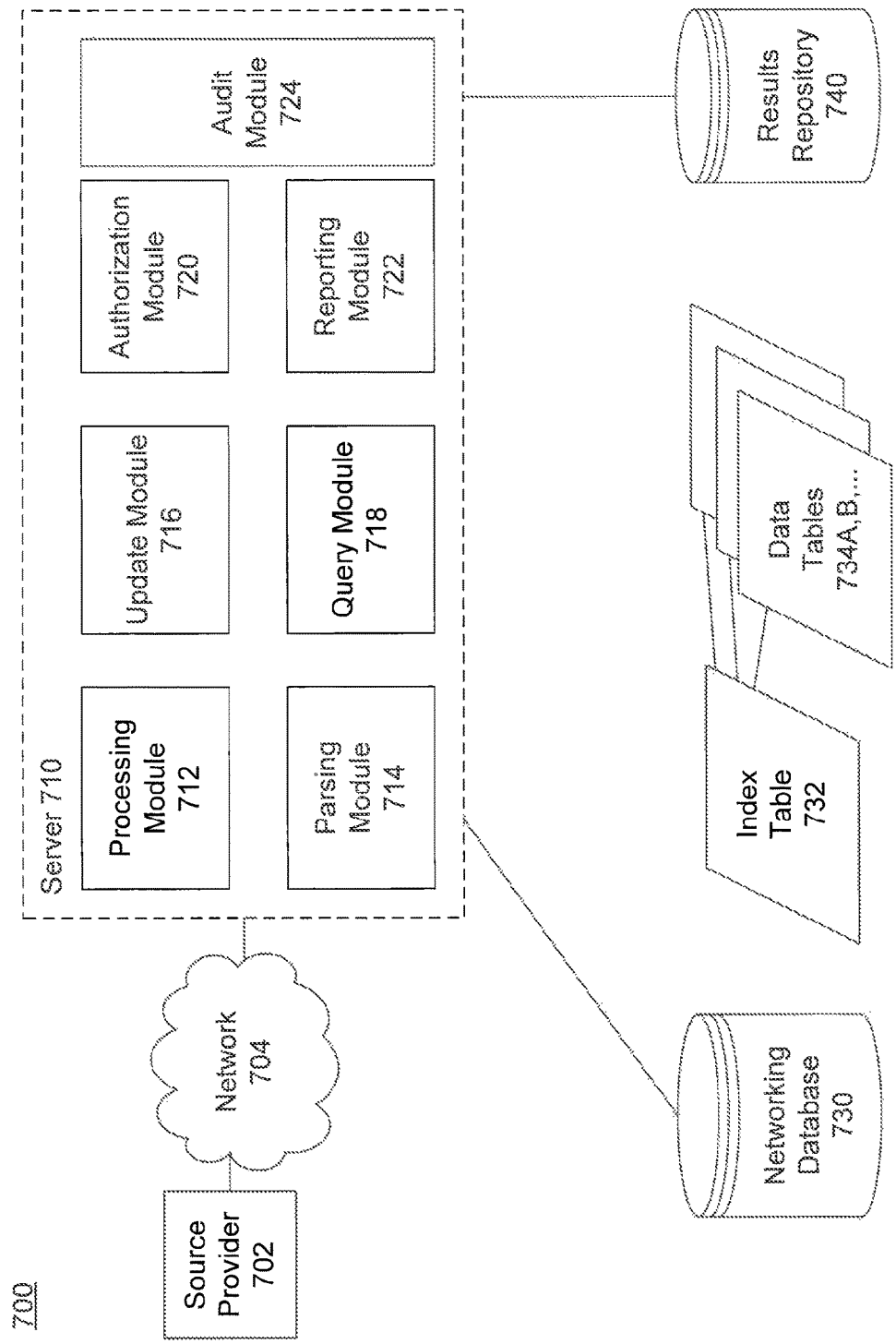
FIG. 7 is a diagram illustrating an example system for managing data related to network elements in a telecommunications network from a plurality of source providers, according to an embodiment.

FIG. 7 is a diagram illustrating an example system for managing data related to network elements in a telecommunications network from a plurality of source providers, according to an embodiment. System 700 includes a source provider 702 and a server 710 connected by one or more networks 704, such as the Internet. Server 710 is also coupled to a networking database 730 and results repository 740.

Server 710 may operate as described above with respect to FIGS. 2-6. In the embodiment of FIG. 7, server 710 includes seven modules: processing module 712, parsing module 714, update module 716, query module 718, authorization module 720, reporting module 722, and audit module 724.

Processing module 712 is responsible for receiving and initially processing documents from source provider 702. In an embodiment, documents may be received via network 704, such as via a hypertext transfer protocol (HTTP) request generated by client 702. In other embodiments, source provider may provide a physical document, which may be manually loaded into system 700. Once the document is received, processing module 712 may determine a document class for the document and generate an intermediate representation of the document, as described with respect to FIG. 2. Processing module 712 may then identify a parsing template for the document, as described with respect to FIG. 2, and send the generated intermediate representation to parsing module 714.

Parsing module 714 is responsible for parsing the intermediate representation to identify relevant values, as described with respect to FIGS. 2-4. Parsing module 714 includes the identified parsing template to parse the intermediate representation. Identified values from the intermediate representation are then correlated to a network model and normalized, as previously described with respect to FIGS. 2-4.

Update module 716 is responsible for writing the normalized values to networking database 730, as described with respect to FIG. 2. Networking database 730 includes a plurality of different types of data related to network elements in the telecommunications network. The written values may be linked to the network elements to which they relate and the correlated network entity attributes of the network model. Update module 716 is also responsible for adding, removing, or updating network entities in the network model, as described with respect to FIG. 1.

Query module 718 is responsible for retrieving data from networking database 730. For example, when presenting data in an interactive user interface, query module 718 may retrieve specified data from networking database 730, as described with respect to FIG. 5. Similarly, query module 718 may also retrieve data from networking database 730 in response to an API request. When auditing data in the networking database, query module 718 may retrieve data to be audited from networking database 730, as described with respect to FIG. 6.

Networking database 730 may be any type of structured data store, including a relational or document-oriented database. To improve performance of database queries and updates, networking database 730 may also include an index table 732. In an embodiment, update module 716 queries index table 732 to assist with data insertions and updates, and query module 718 queries index table 732 to retrieve data. The index table may point to data entries in data tables 734, or, in an embodiment where the database is de-normalized, the index table may itself include the data entries in part or in full. In this manner, index table 732 may be used to improve performance of database queries and updates.

Authorization module 720 is responsible for granting and verifying authorization to data in networking database 730, as described with respect to FIG. 5. Authorization module 720 may also authorize access to data in results repository 740, as previously described with respect to FIG. 6.

Reporting module 722 is responsible for presenting data from networking database 730 in an interactive user interface, as described with respect to FIG. 5. For example, identified data from networking database 730 may be sent via network 704 to an external client device and displayed through a web interface that allows a user to view and interact with the data in a single view. Reporting module 722 is also responsible for generating reports and presenting data from results repository 740, as described with respect to FIG. 6.

Audit module 724 is responsible for auditing data in networking database 730 to detect inconsistencies in the telecommunications network, as described with respect to FIG. 6. In an embodiment, audit module 724 may first determine a set of audit rules to execute. Each audit rule is then executed. Once data is retrieved from networking database 730, as specified by the audit rule, audit module 724 may determine if an inconsistency exists in the retrieved data. In an embodiment, an inconsistency may denote conflicting or invalid data values. If an inconsistency is detected, audit module 724 may write the inconsistent data values to results repository 740. Results repository 740 may be any type of data store, including a relational or document-oriented database.

Each of the servers and modules in FIG. 7 may be implemented on the same or different computing systems having server functionality, in hardware, software, or any combination thereof. Such computing systems can include, but are not limited to, a personal computer, a mobile device such as a mobile phone, workstation, embedded system, game console, television, set-top box, or any other computing system. Further, a computing system can include, but is not limited to, a device having a processor and memory, including a nontransitory memory, for executing and storing instructions. The memory may tangibly embody the data and program instructions. Software may include one or more applications and an operating system. Hardware can include, but is not limited to, a processor, memory, and graphical user interface display. The computing system may also have multiple processors and multiple shared or separate memory components. For example, the computing system may be a part of or the entirety of a clustered computing environment or server farm.

Example Computer System

Figure 8:
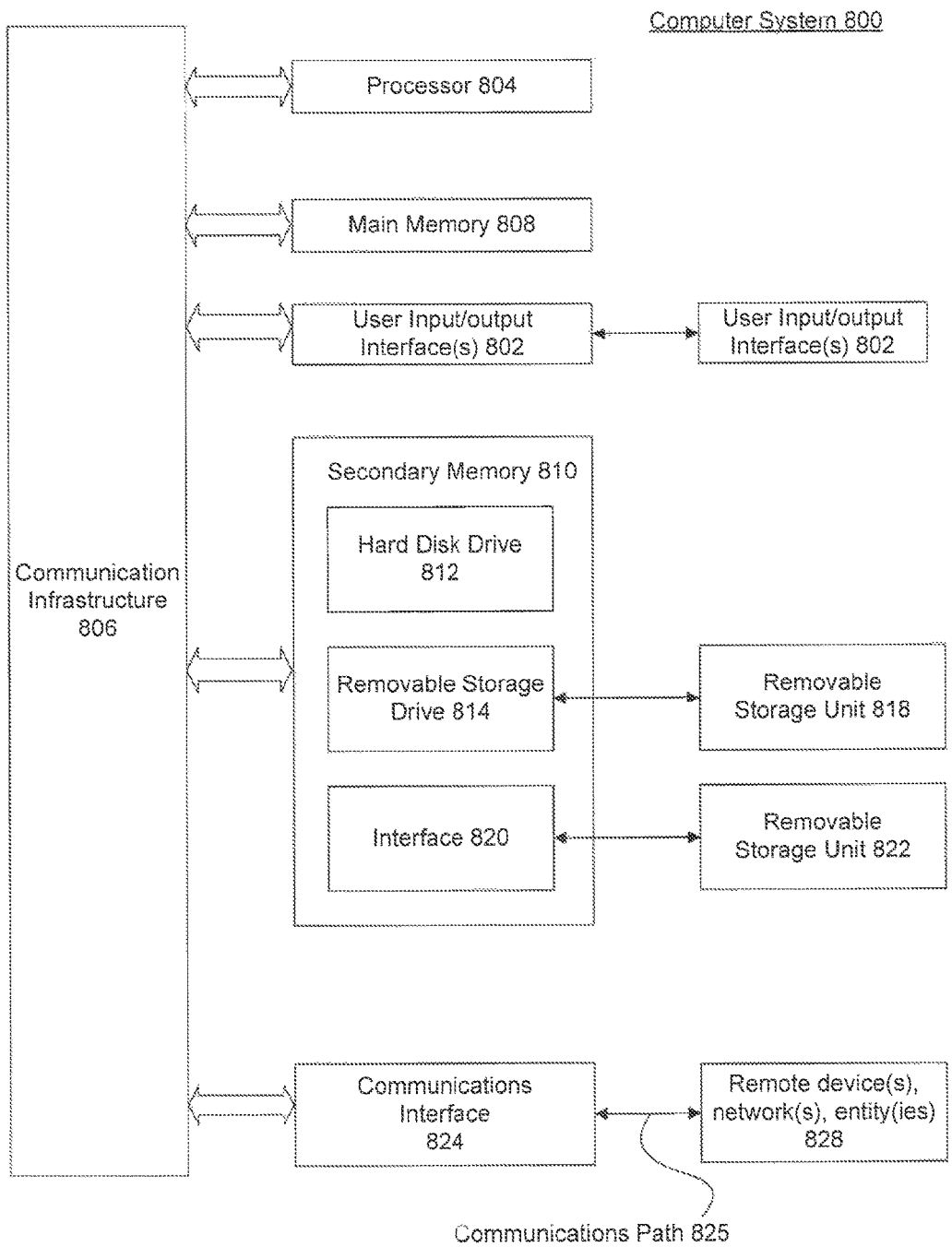
FIG. 8 is a diagram illustrating an example computing device, according to an embodiment.

FIG. 8 is an example computing system useful for implementing various embodiments. Various embodiments can be implemented, for example, using one or more well-known computer systems, such as computer system 800. Computer system 800 can be any well-known computer capable of performing the functions described herein, such as computers available from International Business Machines, Apple, Sun, HP, Dell, Sony, Toshiba, etc.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 8. In particular, embodiments may operate with software, hardware, and/or operating system implementations other than those described herein.

CONCLUSION

In the foregoing description, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Identifiers, such as "(a)," "(b)," "(i)," "(ii)," etc., are sometimes used for different elements or steps. These identifiers are used for clarity and do not necessarily designate an order for the elements or steps.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described embodiments, but should be defined only in accordance with the following claims and their equivalents.

What is claimed is:

1. A method for managing data related to network elements in a telecommunications network, comprising:
   receiving, at a server, a document containing data related to one or more network elements in the telecommunications network, the document associated with a corresponding source provider, a location, a receipt timestamp indicating the time and date that the document was received, and a creation timestamp indicating the time and date that the document was created;
   determining a document class for the document;
   generating an intermediate, in-memory representation of the document data, the intermediate representation comprising a plurality of key-value pairs, wherein each key-value pair is associated with a network element in the telecommunications network;
   identifying a parsing template corresponding to the document class and the corresponding source provider of the document, the parsing template comprising a plurality of parsing rules;
   parsing the intermediate representation according to the plurality of parsing rules to identify relevant values from the intermediate representation;
   correlating the identified values to a network model according to the plurality of parsing rules, the network model comprising a plurality of network entities that represent types of network elements in the telecommunications network, wherein the network model provides a uniform structure to be applied across a plurality of source providers, wherein each network entity of the network model comprises one or more attributes, and wherein each identified value is correlated to an attribute of a network entity in the network model based on a respective parsing rule of the parsing template;
   normalizing each identified value according to a format defined by the network model;
   writing the normalized values to a networking database, the networking database comprising a plurality of different types of data related to network elements in the telecommunications network, wherein the written values are linked to the corresponding associated network elements and correlated network entity attributes.

2. The method of claim 1, wherein the intermediate representation comprises a one-dimensional array of key-value pairs.

3. The method of claim 1, wherein the intermediate representation comprises a multi-dimensional array of key-value pairs.

4. The method of claim 1, wherein the intermediate representation comprises an abstract syntax tree.

5. The method of claim 1, wherein the written data values are further linked to the associated source provider, location, receipt timestamp, and creation timestamp of the document.

6. The method of claim 1, wherein the parsing further comprises, for each parsing rule:
   identifying one or more attributes of network entities of the network model based on the parsing rule; and
   searching keys of the key-value pairs of the intermediate representation for one or more predefined keywords or keyword sequences associated with the identified attributes to identify one or more matching values,
   wherein each identified attribute is associated with at least one predefined keyword or keyword sequence.

7. The method of claim 1, wherein the parsing further comprises:
   identifying one or more attributes of network entities of the network model based on the retrieved parsing rules;
   searching the intermediate representation for keys that match one or more search patterns to identify one or more matching values,
   wherein each search pattern is associated with one or more of the identified attributes, and
   wherein the search patterns are defined as regular expressions.

8. The method of claim 1, wherein the normalizing further comprises, for each identified value:
   retrieving conversion information for the identified value from an associated parsing rule, the conversion information comprising a data format corresponding to the network entity attribute correlated to the identified value; and
   applying the conversion information to the identified value to produce a normalized value.

9. The method of claim 8, wherein the conversion information further comprises a mathematical conversion factor to be applied to the identified data value, and wherein the mathematical conversion factor is associated with the network entity attribute correlated to the identified value.

10. The method of claim 1, wherein the document data relates to network elements in a mobile backhaul network.

11. The method of claim 1, further comprising:
    creating a new network entity representing a new type of network element in the telecommunications network;
    adding the new network entity to the network model; and
    updating one or more parsing templates based on the new network entity.

12. The method of claim 1, further comprising:
    removing a network entity from the network model; and
    updating one or more parsing templates based on the removed network entity.

13. The method of claim 1, wherein the source provider is one of a plurality of types, and wherein the plurality of types comprise equipment, equipment manufacturer, equipment installer, network operator, network planner, and network analytics provider.

14. The method of claim 1, further comprising authorizing a source provider to access data in the networking database.

15. The method of claim 14, wherein the source provider is authorized to access only a portion of the data in the networking database.

16. The method of claim 14, wherein the source provider is authorized to access data in the networking database associated with at least one other source provider.

17. The method of claim 14, wherein the source provider accesses data in the networking database via a data application programming interface (API).

18. The method of claim 1, further comprising:
    receiving a request for data relating to one or more network elements in the telecommunications network;
    identifying data in the networking database that relates to the one or more network elements;
    verifying that the request contains authorization to access the identified data; and
    presenting the identified data in an interactive user interface.

19. The method of claim 1, further comprising auditing the data in the networking database to determine inconsistencies in the telecommunications network.

20. The method of claim 19, wherein the auditing further comprises:
   determining a set of audit rules to execute, each audit rule targeting one or more attributes of network entities of the network model;
   for each audit rule, retrieving data values from the networking database correlated to the one or more target attributes;
   for each audit rule, executing the audit rule on the retrieved data values to determine whether an inconsistency exists; and
   in the event that an inconsistency exists, writing an entry comprising the inconsistent data values and associated network elements to a results repository.

21. The method of claim 20, wherein the inconsistency denotes conflicting data values associated with the same target attribute and network element.

22. The method of claim 20, wherein the inconsistency denotes an invalid data value.

23. The method of claim 20, wherein the set of audit rules is configured to automatically execute at specified time intervals.

24. The method of claim 20, further comprising:
   retrieving the entries from the results repository; and
   presenting the retrieved entries in an interactive user interface.

25. The method of claim 20, further comprising:
   generating a report including the entries from the results repository; and
   distributing the generated report to one or more source providers.

26. The method of claim 20, further comprising authorizing a source provider to access data in the results repository via an application programming interface (API).

27. The method of claim 19, wherein data within the networking database is queried as of a particular point in time, such that data values correlating to a particular time period are recalled.

28. The method of claim 1, wherein the network entities of the network model comprise at least one of a static route entity, a router entity, a site entity, a path entity, a demarcation point entity, an Ethernet LAN entity, an Ethernet line entity, a segment entity, an Ethernet service entity, a region entity, a tunnel entity, an interface entity, a network card entity, a service provider entity, a sub interface entity, a port entity, a microwave radio entity, an Internet Protocol (IP) address entity, a bandwidth entity, and a rate limit entity.

29. The method of claim 1, wherein the data values within the networking database are immutable and are correlated to a determined time period.

30. The method of claim 1, wherein the steps of generating, identifying, parsing, correlating, normalizing, and writing are generated via a functional programming language.

31. The method of claim 1, wherein the telecommunications network includes at least 1000 network elements distributed across at least 5 network sites.

* * * * *